(12) United States Patent
Lord et al.

(10) Patent No.: US 8,590,621 B2
(45) Date of Patent: Nov. 26, 2013

(54) LOW DAMAGE SEAWATER BASED FRAC PACK FLUID

(75) Inventors: Paul D. Lord, Duncan, OK (US);
Jimmie D. Weaver, Duncan, OK (US);
Ivan M. Suleiman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 524 days.

(21) Appl. No.: 12/754,721

(22) Filed: Apr. 6, 2010

(65) Prior Publication Data
US 2011/0240297 A1 Oct. 6, 2011

(51) Int. Cl.
*E21B 43/26* (2006.01)

(52) U.S. Cl.
USPC ..................... 166/305.1; 166/308.2

(58) Field of Classification Search
USPC ................ 166/305.1, 308.1, 308.2
See application file for complete search history.

(56) References Cited

U.S. PATENT DOCUMENTS

| | | | |
|---|---|---|---|
| 5,304,620 A | 4/1994 | Holtmyer et al. | |
| 5,439,057 A * | 8/1995 | Weaver et al. | 166/295 |
| 5,680,900 A | 10/1997 | Nguyen et al. | |
| 5,981,447 A | 11/1999 | Chang et al. | |
| 6,342,467 B1 | 1/2002 | Chang et al. | |
| 6,884,884 B2 | 4/2005 | Magallanes et al. | |
| 7,082,995 B2 * | 8/2006 | Hanes et al. | 166/279 |
| 7,174,960 B2 | 2/2007 | Weaver et al. | |
| 2008/0269082 A1 | 10/2008 | Wilson et al. | |
| 2010/0032160 A1 | 2/2010 | Wilson et al. | |

FOREIGN PATENT DOCUMENTS

| | | |
|---|---|---|
| EP | 0594364 A1 | 4/1994 |
| WO | WO01/96707 | 12/2001 |

OTHER PUBLICATIONS

International Search Report and Written Opinion for PCT/GB2011/000426 dated Jun. 24, 2011.
International Search Report and Written Opinion for PCT/GB2009/001963, dated Oct. 29, 2009.
Halliburton brochure entitled "Enhancement, Hydraulic Fracturing and Acidizing," 2003.
Halliburton brochure entitled "K-Max Plus™ Service for Improved Temporary Fluid Loss Control," 2005.
Halliburton brochure entitled "Sand Control, Max Seal® Fluid Loss Control Additive," 2006.
Halliburton brochure entitled "Sand Control Chemical Products and Services," pp. 11-1-11-34.
Reel Reporter, "SPE/IoTA Roundtable-Houston 2001,Newsletter of the International Coiled Tubing Association," vol. 6, Issue 2, 2001.

* cited by examiner

*Primary Examiner* — Angela M DiTrani
*Assistant Examiner* — Catherine Loikith
(74) *Attorney, Agent, or Firm* — Robert A. Kent; McDermott Will & Emery LLP

(57) ABSTRACT

A method comprises providing a treatment fluid comprising an aqueous fluid, and a low-leakoff particulate, contacting a subterranean formation with the treatment fluid, and allowing the low-leakoff particulate to de-link so that at least a portion of the low-leakoff particulate enters the liquid phase. In some cases the treatment fluid comprises from about 5 to about 120 pounds of low-leakoff particulates per thousand gallons of treatment fluid.

13 Claims, 2 Drawing Sheets

LOW DAMAGE SEAWATER BASED FRAC PACK FLUID

BACKGROUND

The present invention relates to methods and compositions for treating subterranean formations. More particularly, the present invention relates to treatment fluids comprising low-leakoff particulates comprising polymers and crosslinking agents, and methods of use in subterranean operations.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create one or more cracks, or "fractures," in the subterranean formation. In some cases, hydraulic fracturing can be used to enhance one or more existing fractures. "Enhancing" one or more fractures in a subterranean formation, as that term is used herein, is defined to include the extension or enlargement of one or more natural or previously created fractures in the subterranean formation. The fracturing fluid may comprise particulates, often referred to as "proppant particulates," that can be deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the fracturing fluid may be "broken" (i.e., the viscosity of the fluid is reduced), and the fracturing fluid may be recovered from the formation.

Treatment fluids are also utilized in sand control treatments, such as gravel packing. In gravel-packing treatments, a treatment fluid suspends particulates (commonly referred to as "gravel particulates") to be deposited in a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered. In some situations, fracturing and gravel-packing treatments are combined into a single treatment. In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity is important in fracturing and sand control treatments for particulate transport and/or to create or enhance fracture width. Also, maintaining sufficient viscosity may be important to control and/or reduce fluid-loss into the formation. At the same time, while maintaining sufficient viscosity of the treatment fluid often is desirable, it may also be desirable to maintain the viscosity of the treatment fluid in such a way that the viscosity also may be easily reduced at a particular time, inter alia, for subsequent recovery of the fluid from the formation.

To provide the desired viscosity, gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to, guar gums, derivatives thereof, and the like. To further increase the viscosity of a treatment fluid, often the gelling agent is crosslinked with the use of a crosslinking agent. Conventional crosslinking agents usually comprise a metal ion that interacts with at least two gelling agent molecules to form a crosslink between them, thereby forming a "crosslinked gelling agent." In some applications, crosslinking agents act within a specific pH range whereby the crosslink that is formed may be reversed by either raising or lowering the pH. When used in some applications such as seawater, the modification of the pH may result in the formation of additional compounds that can be detrimental to the formation such as precipitates produced due to the presence of various ions in seawater.

In addition to those components discussed above, conventional fluid loss additives can be used to prevent or limit the amount of fluid lost to the formation, for example during a hydraulic fracturing operation. Typical fluid loss control additives for stimulation fluids can comprise solids such as ground salt, ground calcium carbonate, starch and the like. In some instances, a gelling agent can act as a fluid loss additive by preventing the flow of the fluid into the subterranean formation. These materials can be difficult to remove from the fractures, particularly after the fracture is propped open by the introduction of a proppant particulates. The presence of unremoved fluid loss additives can result in a significant reduction in the production flow capacity of the fracture. In addition to the reduction in flow capacity, the use of conventional fluid loss additives may increase the complexity and cost of a treatment fluid and/or a subterranean application utilizing that fluid. Moreover, many conventional fluid loss additives permanently reduce the permeability of a subterranean formation, affect the rheology of the treatment fluid in which they are used, and/or reduce the rate at which the fluid is allowed to penetrate or leak off into the subterranean formation. In terms of placing the treatment fluid into the subterranean formation, any attempt to increase the stimulation fluid viscosity to a level whereby fluid loss can be controlled without using significant quantities of particulate fluid loss additives can result in an increase in the friction pressures resulting from the higher viscosity fluid. This may limit the pumping rate and diminish the ability to produce a desired fracture length.

In some instances, while it may be desirable to control or prevent fluid loss for a given period of time it may become desirable to allow the treatment fluid to penetrate or leak off into the subterranean formation, or to increase the permeability of the subterranean formation, at some later point in time. Costly and time-consuming operations may be required to reverse the effects of conventional fluid loss control additives on the treatment fluid and/or to restore permeability to those portions of the subterranean formation affected by the fluid loss control additives.

SUMMARY

The present invention relates to methods and compositions for treating subterranean formations. More particularly, the present invention relates to treatment fluids comprising low-leakoff particulates comprising polymers and crosslinking agents, and methods of use in subterranean operations.

In an embodiment of the present invention, a method comprises providing a treatment fluid comprising an aqueous fluid, and a low-leakoff particulate; contacting a subterranean formation with the treatment fluid; and allowing the low-leakoff particulate to de-link so that at least a portion of the low-leakoff particulate enters the liquid phase.

In another embodiment of the present invention, a method comprises providing a treatment fluid comprising an aqueous fluid, a low-leakoff particulate, and proppant particulates; contacting a subterranean formation with the treatment fluid at a pressure sufficient to create at least one fracture therein; contacting at least a portion of the treatment fluid with a breaker wherein the low-leakoff particulate de-links such that at least a portion of the low-leakoff particulate enters the liquid phase; and recovering at least a portion of the treatment fluid.

In still another embodiment of the present invention, a treatment fluid comprises an aqueous fluid; and a low-leakoff particulate, wherein the low-leakoff particulate comprises a low molecular weight polymer and a crosslinking agent.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
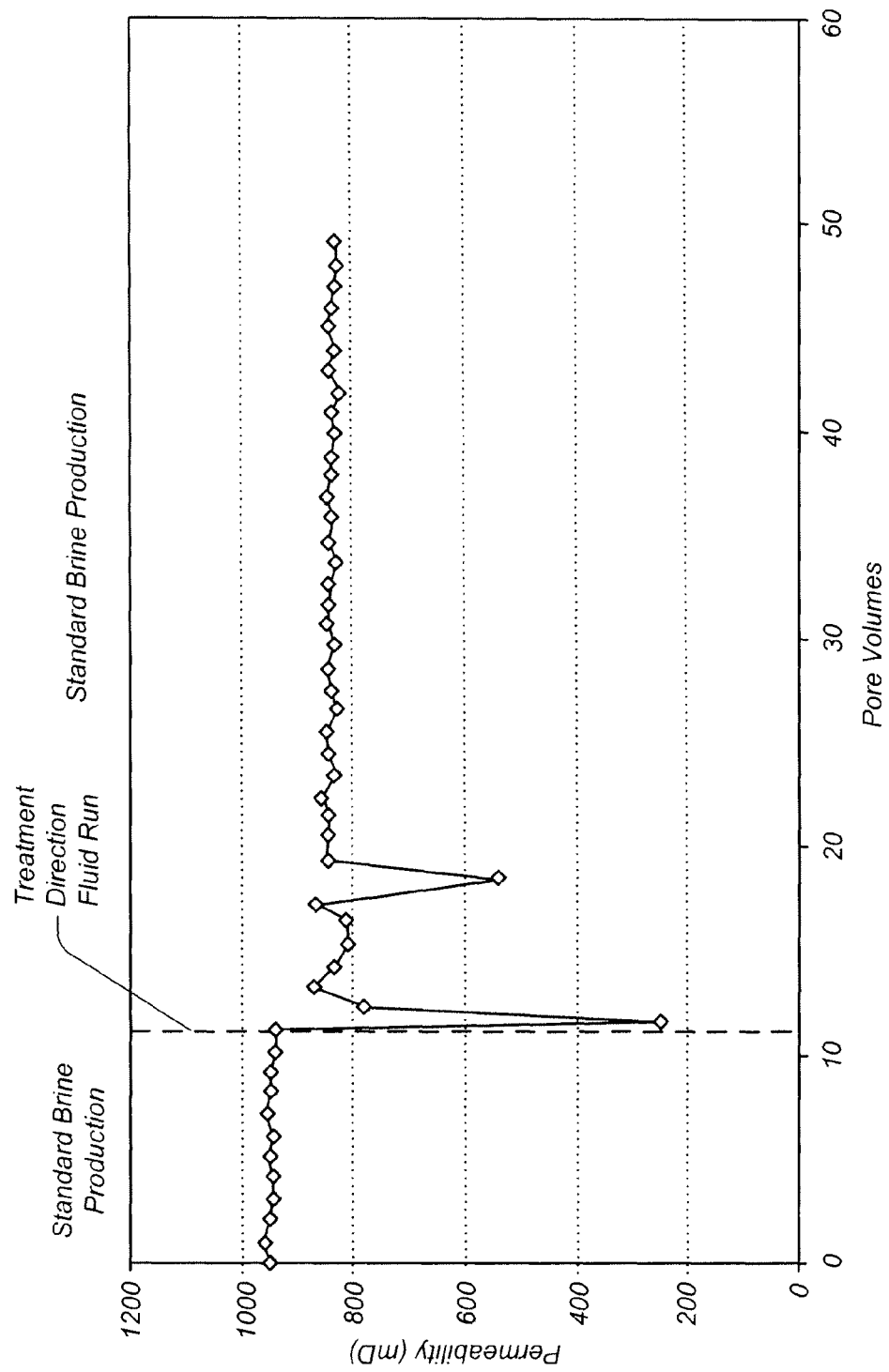
FIG. 1 illustrates a regained permeability profile for a treatment fluid prepared according to an embodiment of the present invention.

The present invention relates to methods and compositions for treating subterranean formations. More particularly, the present invention relates to treatment fluids comprising low-leakoff particulates comprising polymers and crosslinking agents, and methods of use in subterranean operations.

The treatment fluids of the present invention may provide a number of advantages, not all of which will be discussed here. The use of seawater may limit the amount and types of additives that can be used in the treatment fluid, limiting the range of properties that can be achieved with traditional additives. The use of the treatment fluids of the present invention may allow for a higher viscosity fracturing fluid with a lower concentration of gelling agent and crosslinker when seawater is used as the aqueous base fluid. In addition, the treatment fluids of the present invention may have increased rheological properties such that a separate solid fluid loss additive may not be required. The problems associated with breaking down and removing solid fluid loss additives may thus be avoided while maintaining a desired level of high leak off control.

The low-leakoff particulates of the present invention generally comprise a polymer and a crosslinking agent. In some embodiments, the low-leakoff particulates can comprise a component of a treatment fluid. The treatment fluids of the present invention generally comprise an aqueous base fluid and a low-leakoff particulate comprising a low molecular weight polymer, and a crosslinking agent. Among other things, the treatment fluids of the present invention may exhibit enhanced rheological properties and an increased recovery when compared to other treatment fluids.

Suitable low-leakoff particulates for use with the present invention generally comprise a polymer and a crosslinking agent. A buffering agent may be used to prepare the low-leakoff particulates and may optionally be included in the low-leakoff particulates of the present invention. The polymer may comprise any polymer capable of being crosslinked with a crosslinking agent. The low-leakoff particulates may be gelatinized, dried and ground, or extruded to form particles with generally spherical, fibrous, polygonal (such as cubic materials), flake like, rod like, or string like shapes. In general, the combination of the polymer and the crosslinking agent may be in a gelatinous, semi-solid, or solid particulate form. In an embodiment, the low-leakoff particulates may be present in the treatment fluid in an amount ranging from about 5 to about 120 pounds per thousand gallons of treatment fluid.

The size distribution of the low-leakoff particulates may be selected to bridge the pore throats of a subterranean formation into which the low-leakoff particulates are introduced. Generally speaking, the particle size distribution of the low-leakoff particulates must be sufficient to bridge across and seal the desired opening downhole. For example, if the pore throats (i.e., very small openings) on a portion of a subterranean formation are to be bridged, then it would be beneficial to use smaller low-leakoff particulates. A suitable size range for this type of application would range from about 0.1 microns to about 200 microns. In other applications, larger low-leakoff particulates will be appropriate, for example, when bridging on a gravel pack. Suitable size ranges for such applications include about 1 micron to about 1 millimeter. In other applications, the particle size range may be from about 5 microns to about 8 millimeters. This range may be preferred when, for example, the operation involves sealing on perforations or other openings, such as objects having a plurality of holes.

The low-leakoff particulates comprise a polymer. Suitable polymers for use with the low-leakoff particulates of the present invention may comprise modified or derivatized polymers. The modified polymers may include hydrophobic modifications including the incorporation of hydrophobic groups into a hydrophilic polymer structure. In certain embodiments, the low-leakoff particulates comprises a hydrophilic polymer backbone and alkyl branch of 4 to 22 carbons (e.g., 6 carbons, 8 carbons, 10 carbons, 12 carbons, 14 carbons, 16 carbons, 18 carbons, 20 carbons). In certain embodiments, the low-leakoff particulates may comprise a polyelectrolyte containing only one type of charge, for example, an anionic or a cationic polymer. Examples of suitable low-leakoff particulates include, but are not limited to, modified polysaccharides and derivatives thereof that contain one or more of these monosaccharide units: galactose; mannose; glucoside; glucose; xylose; arabinose; fructose; glucuronic acid; or pyranosyl sulfate. Examples of suitable modified polysaccharides include, but are not limited to, modified guar gum and derivatives thereof, such as modified hydroxypropyl guar and modified carboxymethylhydroxypropyl guar, and modified cellulose derivatives, such as modified hydroxyethyl cellulose and modified carboxymethyl cellulose. Additionally, synthetic polymers and copolymers that contain the above-mentioned functional groups may be used. Examples of such synthetic polymers include, but are not limited to, a polyacrylate, a modified polyacrylate, a polymethacrylate, modified polymethacrylate, a polyacrylamide, a modified polyacrylamide, a polyvinyl alcohol, a modified polyvinyl alcohol, a polyvinylpyrrolidone, and a modified polyvinylpyrrolidone. Combinations of modified polymers may also be suitable.

In some embodiments of the present invention, the low-leakoff particulates may comprise a low molecular weight polymer. The molecular weight may vary depending on the specific polymer or combination of polymers used to form the low-leakoff particulate. The molecular weight will generally be low enough such that the low-leakoff particulate can be formed and is suitable to impart the desired rheological properties to a viscosified treatment fluid. In an embodiment, the molecular weight of the polymer in the low-leakoff particulate may be low enough such that the polymer is able to form a solution when the low-leakoff particulate is broken down. For example, the molecular weight range may be obtained through depolymerization of natural polymers such as guars or derivatized guars. In an embodiment, the low-molecular weight polymers can be depolymerized such that the average molecular weight of the low-molecular weight polymer is less than about 50% of the original polymer molecular weight. For example, the guar polymer, which is derived from the beans of a guar plant, may have a molecular weight ranging from 2 to 4 million, which may be reduced through depolymerization to the desired molecular weight range, several techniques for which are described below. In this example, the molecular weight of the polymer in a guar based low-leakoff particulate may range from about 250,000 to about 500,000 as reduced from the natural molecular weight range of the guar polymer. A person of ordinary skill in the art can determine the appropriate molecular weight range for a specific polymer used to form the low-leakoff particulate.

The polymer or polymers of the low-leakoff particulates may be manufactured by any method known in the art. In one such method, a polymer having a relatively high molecular weight may be subjected to extensive depolymerization whereby the polymer backbone is divided into relatively short chain polymer segments. In some cases, the polymer may be derivatized. Such polymers may be made by derivatization and depolymerization techniques known in the art. Some such suitable methods of manufacture are described in U.S. Pat. No. 7,174,960, the relevant disclosure of which is incorporated herein by reference. Other suitable methods of manufacture are described in U.S. Pat. No. 6,884,884, the relevant disclosure of which is incorporated herein by reference. In one embodiment, the depolymerized polymer of the present invention may be prepared by adding a polymer (such as a polysaccharide or a derivatized polysaccharide) to be depolymerized to a reactor vessel together with a small quantity of hydrogen peroxide and water. The reactor vessel may be heated to an elevated temperature, such as about 100° F., to initiate the reaction in cases wherein the ambient temperature is insufficient to initiate the reaction. Once initiated, the depolymerization reaction is exothermic and the temperature of the reactor vessel generally should be maintained in the range of from about 100° F. to about 200° F. for a sufficient time for the polymer to degrade to the desired molecular weight. While not intending to be limited by theory, it is believed that the use of a low molecular weight polymer or polymers will increase the ability to clean up the subterranean formation and recover the treatment fluids as the polymer or polymers of the low-leakoff particulates do not need to be depolymerized inside the reservoir, but rather, may only require de-crosslinking.

In another embodiment, one or more irradiation processes may be used to process the polymer or polymers of the low-leakoff particulates to reduce the molecular weight distribution. The radiation may be provided by electromagnetic radiation, for example, gamma rays, x-rays, or ultraviolet rays. The doses applied depend on the degree of depolymerization desired and the particular polymer or polymer blend used as a feedstock. For example, high doses of radiation can break chemical bonds within feedstock components and low doses of radiation can increase chemical bonding (e.g., crosslinking) within feedstock components. One of ordinary skill in the art can determine the amount and type of radiation needed to depolymerize a selected polymer for use in the low-leakoff particulates of the present invention.

The low-leakoff particulates comprise a suitable crosslinking agent, inter alia, to crosslink the polymer of the low-leakoff particulate. The term "crosslinking agent" is defined herein to include any molecule, atom, or ion that is capable of forming one or more crosslinks between molecules of a crosslinkable polymer and/or between one or more atoms in a single molecule of a crosslinkable polymer. In an embodiment, the crosslinking agent may be pH sensitive in that the crosslinking agent may form a crosslink at a certain pH but not at a different pH. In these embodiments, the crosslinking agent may form reversible crosslinks based on the pH of the treatment fluid. The crosslinking agent may comprise a metal ion that is capable of crosslinking at least two molecules of the crosslinkable polymer. Examples of suitable crosslinking agents include, but are not limited to, borate ions, zirconium ions, titanium ions, aluminum ions, antimony ions, chromium ions, iron ions, copper ions, zinc ions, and/or any other suitable ions or atoms capable of forming a crosslink. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and any combination thereof. An example of a suitable commercially available compound capable of providing metal ions is "CL-31™" crosslinker available from Halliburton Energy Services, Inc., Duncan, Okla. The choice of crosslinking agent may depend, at least in part, on the polymer or polymers in the low-leakoff particulate and the pH at which the particulates will be used. In certain embodiments of the present invention, the crosslinking agent may be present in a low-leakoff particulate, wherein at least a portion of the molecules of the low-leakoff particulates are crosslinked by the crosslinking agent.

Suitable crosslinking agents may be present in the low-leakoff particulates of the present invention in an amount sufficient to provide, inter alia, the desired degree of crosslinking between molecules of the polymer in the low-leakoff particulates. In certain embodiments, the crosslinking agent may be present in the low-leakoff particulates of the present invention in an amount in the range of from about 0.01% to about 10% by weight of the low-leakoff particulates. One of ordinary skill in the art, with the benefit of this disclosure, will recognize the appropriate type and amount of crosslinking agent to include in a treatment fluid of the present invention based on, among other things, the temperature conditions of a particular application, the type of polymer used, the molecular weight of the polymer, the degree of rheological modification desired within the treatment fluid, and/or the pH of the treatment fluid.

Buffering agents may be used to form the low-leakoff particulates. In an embodiment, the low-leakoff particulates can be formed by adding the crosslinking agent to a solution containing the polymer to form a precipitate useful in forming the low-leakoff particulates. The precipitated material can be used directly as a low-leakoff particulate, or it can be dried, ground, and reshaped to form a low-leakoff particulate of a desired size and shape. In some embodiments, a buffering agent can be added to the solution containing the polymer during formation to control the rate at which the precipitate forms. Suitable buffering agents include any compounds capable of maintaining the pH of the solution containing the polymer. Examples of buffering agents that may be used include, but are not limited to, magnesium oxide, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, derivatives thereof, and any combinations thereof. The resulting low-leakoff particulates formed from a process that comprises a buffering agent can comprise the buffering agent.

When used in the low-leakoff particulates, the buffering agent may be present in the low-leakoff particulates in an amount in the range of from about 0.5% to about 10% by weight of the low-leakoff particulates. In other embodiments, the buffering agent may be present in the low-leakoff particulates of the present invention in an amount in the range of from about 0.01% to about 0.3% by weight of the low-leakoff particulates.

In an embodiment, a treatment fluid comprises the low-leakoff particulates. The treatment fluids of the present invention generally comprise an aqueous base fluid and a low-leakoff particulate comprising a low molecular weight polymer, and a crosslinking agent.

The aqueous base fluid used in the treatment fluids of the present invention can comprises any suitable aqueous fluid known to one of ordinary skill in the art. Suitable aqueous fluids may include, but are not limited to, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the water may be from any source, provided that it does not contain components that might adversely affect the stability and/or performance of the treatment fluids of the present invention. In certain embodiments, the density of the aqueous base fluid can be increased, among other purposes, to provide additional particle transport and suspension in the treatment fluids of the present invention. In certain embodiments, the pH of the aqueous base fluid may be adjusted (e.g., by a buffer or other pH adjusting agent), among other purposes, to facilitate hydration of an optional gelling agent, to activate a crosslinking agent, to increase the viscosity of the treatment fluid (e.g., activate a crosslinker, maintain the stability of the low-leakoff particulate), and/or to reduce the viscosity of the treatment fluid (e.g., activate a breaker, deactivate a crosslinking agent). In these embodiments, the pH may be adjusted to a specific level, which may depend on, among other factors, the type of low-leakoff particulate, and/or crosslinking agents in the treatment fluid. In general, the pH of the fluid may be above about 9 when a stable gelled fluid is desired and below about 9 when it is desirable to recover the fluid from the subterranean formation. Other pH ranges may be suitable based on the specific low-leakoff particulate chosen for a specific application. One of ordinary skill in the art, with the benefit of this disclosure, will recognize when such density and/or pH adjustments are appropriate.

In an embodiment, the treatment fluid may comprise a viscosifier in addition to the low-leakoff particulates. In an embodiment, a viscosifier may include any material capable of increasing the viscosity of the treatment fluid. Suitable viscosifiers may include, but are not limited to, gelling agents, surfactants, salts, any other material capable of increasing the viscosity of a fluid, or any combination thereof. Suitable gelling agents may include galactomannan gums, modified or derivative galactomannan gums, xanthan, other polysaccharides, and cellulose derivatives. Additional examples of gelling agents which may be utilized in the present invention include but are not limited to guar, hydroxypropylguar, carboxymethylhydroxypropyl guar, carboxymethylguar, caboxymethylcellulose, carboxymethylhydroxy-ethylcellulose, and mixtures thereof. Preferred gelling agents include guar and hydroxypropyl guar. Other natural or synthetic polymers which are known in the art but which are not specifically mentioned herein can also be utilized. The gelling agent is present in the treatment fluid in an amount in the range of from about 10 to about 100 pounds per 1000 gallons of aqueous fluid, preferably from about 25 to about 50 pounds per 1000 gallons of aqueous fluid. The aqueous fluid is present in the treatment fluid in at least an amount sufficient to hydrate the gelling agent.

In an embodiment in which the viscosifier is a gelling agent, the treatment fluids of the present invention may comprises a suitable crosslinking agent, inter alia, to crosslink the gelling agent. Crosslinking agents may be included in the treatment fluids of the present invention to crosslink at least a portion of the molecules of the gelling agent to form a crosslinked gelling agent. The crosslinking agent may comprise a metal ion that is capable of crosslinking at least two molecules of the crosslinkable polymer. Examples of suitable crosslinking agents include, but are not limited to, borate ions, zirconium ions, titanium ions, aluminum ions, antimony ions, chromium ions, iron ions, copper ions, zinc ions, and/or any other suitable ions or atoms capable of forming a crosslink. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and any combination thereof. An example of a suitable commercially available compound capable of providing metal ions is "CL-31™" crosslinker available from Halliburton Energy Services, Inc., Duncan, Okla. In an embodiment, the crosslinking agent may be pH sensitive in that the crosslinking agent may form a crosslink at a certain pH but not at a different pH. In these embodiments, the crosslinking agent may form reversible crosslinks based on the pH of the treatment fluid. The choice of crosslinking agent may depend, at least in part, on the gelling agent and the pH of the treatment fluid.

In some embodiments, the crosslinking agent used within the treatment fluid may comprise a delayed crosslinking agent, which may be formulated to form crosslinks between polymer molecules after a certain time or under certain conditions (e.g., temperature, pH, etc.). In some embodiments, the treatment fluid may comprise a crosslinking delaying agent, such as a polysaccharide crosslinking delaying agents derived from guar, guar derivatives, or cellulose derivatives. The crosslinking delaying agent may be included in the treatment fluid, inter alia, to delay crosslinking of the gelling agent until desired. One of ordinary skill in the art, with the benefit of this disclosure, will know the appropriate amount of the crosslinking delaying agent to include in the treatment fluid.

Suitable crosslinking agents may be present in the treatment fluids of the present invention in an amount sufficient to provide, inter alia, the desired degree of crosslinking between molecules of the gelling agent. In certain embodiments, the crosslinking agent may be present in the aqueous phase of the treatment fluid of the present invention in an amount in the range of from about 1.5 pounds of active crosslinking agent per 1000 gallons of treatment fluid (i.e., pounds per thousand gallons or "ppt") to about 25 ppt. In certain exemplary embodiments, the crosslinking agent may be present in the treatment fluids of the present invention in an amount in the range of from about 3 ppt to about 14 ppt. One of ordinary skill in the art, with the benefit of this disclosure, will recognize the appropriate type and amount of crosslinking agent to include in a treatment fluid of the present invention based on, among other things, the temperature conditions of a particular application, the type of gelling agent used, the molecular weight of the gelling agent, the degree of rheological modification desired, and/or the pH of the treatment fluid.

In order to achieve a desired pH for the treatment fluids of the present invention, a pH adjusting agent may be used. Suitable pH adjusting agents include any compounds capable of altering the pH of the treatment fluid. Examples of such compounds that may be used include, but are not limited to, formic acid, fumaric acid, acetic acid, acetic anhydride, hydrochloric acid, sodium hydroxide, potassium hydroxide, lithium hydroxide, various carbonates, any combination thereof, or any other commonly used pH control agent that does not adversely react with the gelling agent, crosslinker, or buffering agent within the treatment fluid to prevent its use in accordance with the method of the present invention. Of these, sodium hydroxide is preferred. When used, the pH-adjusting compound is generally present in a treatment concentrate in an amount in the range of from about 0.5% to about 10% by weight of the aqueous fluid therein, and can be added to the treatment fluid in an amount such that the pH-adjusting compound is present in a treatment fluids of the present invention in an amount in the range of from about 0.01% to about 0.3% by weight of the aqueous fluid therein.

Buffering agents may be used with the pH adjusting agents within the aqueous phase of the treatment fluids to provide a desired pH. The treatment fluids of the present invention may be stable at a pH of about 9 or above. For embodiments using seawater or other brine, the pH of the treatment fluid may be limited by the potential of the treatment fluid to form a precipitate comprising multivalent ion hydroxides in solution. Such precipitates have the potential to damage the formation and block the pore throats within the formation. In order to reduce the formation of these precipitates and maintain the pH at which the treatment fluid is stable, the treatment fluid may comprise a buffering agent. The buffering agent may neutralize any acid generated during preparation and use of the treatment fluids of the present invention (e.g., from any breakers that may be present) while reducing the tendency of the treatment fluid to form precipitates. Suitable buffering agents include any compounds capable of maintaining the pH of the treatment fluid while limiting the formation of precipitates from the treatment fluid. Examples of buffering agents that may be used with the treatment fluid include, but are not limited to, magnesium oxide, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, derivatives thereof, and any combinations thereof.

When used in the treatment fluid, the buffering agent is generally present in the treatment fluid in an amount in the range of from about 0.5% to about 10% by weight of the treatment fluid. In other embodiments, the buffering agent is generally present in the treatment fluids of the present invention in an amount in the range of from about 0.01% to about 0.3% by weight of the treatment fluid. The amount of buffering agent used will depend on the desired pH change. One of ordinary skill in the art with the benefit of this disclosure will recognize the appropriate amount of buffering agent to include to achieve a desired pH change.

The treatment fluids of the present invention optionally may comprise proppant particulates. Proppant particulates suitable for use in the present invention may comprise any material suitable for use in subterranean operations. Suitable materials for these proppant particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The proppant particulate size generally may range from about 2 mesh to about 400 mesh on the U.S. Sieve Series; however, in certain circumstances, other sizes may be desired and will be entirely suitable for practice of the present invention. In particular embodiments, preferred proppant particulates size distribution ranges are one or more of 6/12, 8/16, 12/20, 16/30, 20/40, 30/50, 40/60, 40/70, or 50/70 mesh. It should be understood that the term "proppant particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the proppant particulates included in the treatment fluids of the present invention may be coated with any suitable resin or tackifying agent known to those of ordinary skill in the art. In certain embodiments, the proppant particulates may be present in the treatment fluids of the present invention in an amount in the range of from about 0.5 pounds per gallon ("ppg") to about 30 ppg by volume of the treatment fluid.

The treatment fluids of the present invention optionally may include one or more of a variety of well-known additives, such as gel stabilizers, fluid loss control additives, acids, corrosion inhibitors, catalysts, clay stabilizers, biocides, bactericides, friction reducers, gas, surfactants, solubilizers, and the like. For example, in some embodiments, it may be desired to foam a treatment fluid of the present invention using a gas, such as air, nitrogen, or carbon dioxide. Those of ordinary skill in the art, with the benefit of this disclosure, will be able to determine the appropriate additives for a particular application.

The inclusion of the low-leakoff particulates in the treatment fluid may affect the rheological properties of a treatment fluid comprising the low-leakoff particulates, for example, by forming associative interactions between groups of the polymers, a crosslinking agent, or both to form intermolecular bonds, inter-particulate bonds, or both. Such interactions may result in the formation of a network between the low-leakoff particulates within the treatment fluid. As the low-leakoff particulate may affect the rheological properties of the treatment fluid, the low-leakoff particulates may be used to increase the viscosity without the addition of another viscosifier. In another embodiment, a treatment fluid comprising a low-leakoff particulate may reduce the amount of viscosifier and/or crosslinker required to obtain the same rheological profile. In an embodiment, a treatment fluid comprising low-leakoff particulates may have an increased viscosity relative to a treatment fluid without low-leakoff particulates. In an embodiment, the viscosity of a treatment fluid comprising a low-leakoff particulate may increase about 100 centipoise (cP) to about 400 cP relative to a fluid without a low-leakoff particulate. The reduction in the amount of viscosifier used may aid in the cleanup of the fluid after a treatment operation.

When a pH sensitive crosslinking agent is used with the low-leakoff particulates and/or the treatment fluid, a pH-adjusting agent (as described above) may be used to elevate the pH of the treatment fluid to a pH range in which the crosslinking agent forms stable crosslinks within the low-leakoff particulates and/or the treatment fluid. A breaker may then be used to change the pH to a range in which the crosslinks are broken. When breakers are used with the treatment fluid of the present invention, the gelling agent may break. In addition, the low-leakoff particulates may de-link and break apart due to the loss of the cohesive force provided by the crosslinking agent within the low-leakoff particulates. As used herein, "de-linking" refers to the process by which the intermolecular attractive forces between the low-molecular weight polymer molecules and the crosslinking agent in the low-leakoff particulates lose that attractive force. As the low-leakoff particulates comprise a low-molecular weight polymer, the polymer in the low-leakoff particulates may then dissolve and/or form a low viscosity fluid that can be removed from the subterranean formation as the treatment fluid is removed. An advantage of the methods and treatment fluids described herein includes the use of the low-molecular weight polymers that may not require additional polymer decomposition (e.g., additional hydrolysis to form lower molecular weight polymers) to be readily removable from the subterranean environment. In other words, the treatment fluid comprising the low-leakoff particulates may be more easily and more completely removed at the desired time than previous leakoff control agents. This may be beneficial as the use of the low-leakoff particulates may minimize any potential permeability-loss problem resulting from use of traditional, solid fluid loss control agents.

For a system using a borate crosslinker in the low-leakoff particulates and/or the treatment fluid as an example, the pH of the treatment fluid may be raised to above about 9 using a pH-adjusting agent. At that pH, the borate compound crosslinking agent may form stable crosslinks with the gelling agent in the treatment fluid and maintain the crosslinks within the low-leakoff particulates. When the pH falls below about 9, the crosslinked sites within the treatment fluid and/or the low-leakoff particulates may no longer be crosslinked. When treatment fluid of this invention contacts the subterranean formation being treated, the pH may be lowered to some degree, which begins the breaking process for the treatment fluid and/or the low-leakoff particulates. The breaker may be effective in breaking the crosslinks present in the low-leakoff particulates and the crosslinked gelling agents present in the treatment fluid in order to cause the treatment fluid to completely revert to a thin fluid in a short period of time.

In some embodiments, a delayed breaker capable of lowering the pH of the treating fluid may be included in the treating fluid. Examples of delayed breakers that may be used include, but are not limited to, various lactones, esters, encapsulated acids and slowly soluble acid generating compounds, oxidizers which produce acids upon reaction with water (such as polyesters or polyorthoesters), water reactive metals such as aluminum, lithium and magnesium and the like. In certain embodiments, the delayed breaker is an ester.

Where used, the breaker is generally present in the treating fluid in an amount in the range of from about 0.01% to about 1% by weight of the aqueous fluid therein. Alternatively, any of the conventionally used delayed breakers employed with metal ion crosslinkers may be used, for example, oxidizers such as sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase. The specific breaker used, whether or not it is encapsulated, as well as the amount thereof employed will depend upon the breaking time desired, the nature of the polymer and crosslinking agent, formation characteristics and conditions and other factors.

The preparation of the treatment fluids generally involves the steps of metering a treatment fluid concentrate into a blender wherein it may be mixed with an aqueous fluid, low-leakoff particulates, and any optional additives. The mixture may then be substantially simultaneously pumped out of the blender and into the subterranean formation to be treated by way of a well bore penetrating it. In such a method, the time lapse from when the metering, mixing, and pumping process starts to when the treatment fluid reaches the subterranean formation may be only a few minutes. This allows changes in the properties of the treatment fluid to be made on the surface as required during the time the treating fluid is being pumped. For example, in a fracturing procedure carried out in a subterranean formation to stimulate production from the subterranean formation, changes may be made to the fracturing fluid during the pumping of the fluid in response to continuously monitored down hole parameters to achieve desired fracturing results, that is, the viscosity of the fracturing fluid, the amount of proppant material carried by the fracturing fluid and other properties of the fracturing fluid can be continuously measured on the surface and changed as required to achieve optimum down hole treatment results in real time. Those of ordinary skill in the art, with the benefit of this disclosure will be able to determine other suitable methods for the preparation of the treatments fluids of the present invention.

The methods of the present invention may be employed in any subterranean treatment where a treatment fluid may be used. Suitable subterranean treatments may include, but are not limited to, fracturing treatments, frac-pack treatments, sand control treatments (e.g., gravel packing), and other suitable treatments where a treatment fluid of the present invention may be suitable. In one embodiment, the present invention provides a method of treating a portion of a subterranean formation comprising: providing a treatment fluid that comprises an aqueous fluid, a low-leakoff particulate, a crosslinking agent, and optionally a buffering agent; and introducing the treatment fluid into a well bore penetrating the subterranean formation. Subsequent to the introduction of the treatment fluid into the well bore, the viscosity of the treatment fluid may be reduced at a desired time, and the reduced viscosity treatment fluid may be recovered and/or produced back through the well bore.

To facilitate a better understanding of the present invention, the following examples of certain aspects of some embodiments are given. In no way should the following examples be read to limit, or define, the scope of the invention.

EXAMPLE 1

A treatment fluid for use as a low leakoff frac-pack fluid was prepared according to a design for a formation with a permeability of 1 Darcy. The fluid combined 688 ml of seawater, 312 ml of Instavis (a liquid gelling agent concentrate containing a hydroxypropyl guar gelling agent at a concentration of about 80 pounds per thousand gallons of treatment fluid ("ppt") available from Halliburton Energy Services, Inc. of Houston, Tex.). MO-67™ (available from Halliburton Energy Services, Inc. of Houston, Tex.), which is a pH adjusting agent comprising NaOH, was added in an amount sufficient to obtain a pH of about 9.3. A low-leakoff particulate comprising hydroxypropyl guar crosslinked with boron was added at a concentration equivalent to 80 ppt. A borate crosslinker was added at a concentration of 2 gallons per thousand gallons of treatment fluid ("gpt") (CL-38™ crosslinker, available from Halliburton Energy Services, Inc. of Houston, Tex.). A gel breaker was added at a concentration equivalent to 10 gpt (VICON NF™ breaker, available from Halliburton Energy Services, Inc. of Houston, Tex.) along with a catalyst for activation of the gel breaker at a concentration equivalent to 2 gpt (CAT-OS-1™ breaker catalyst, available from Halliburton Energy Services, Inc. of Houston, Tex.). The base gel had a viscosity of 18.2 cP.

The ability of the treatment fluids of the present invention to provide static fluid loss control and the regained permeability subsequent to the treatment is determined in accordance with the following procedure. A synthetic core material comprising a ceramic having a 5 micron permeability is prepared in lengths of about 4 to 6 cm. The cores have a diameter of about 2.4 cm to 2.6 cm. The cores then are vacuum saturated in filtered API brine, Individual cores then are mounted in a Hassler sleeve device. The flow direction from left-to-right is designated as the production direction and from right-to-left is designated as the treatment direction to simulate the relative directions of movement in treating an actual subterranean formation. A hollow spacer is installed adjacent the core to act as a perforation cavity. Overburden pressure on the Hassler sleeve is administered by maintaining differential pressure from the treating pressure being used. The core is heated to and then maintained throughout the test at a temperature of 180° F. The core then is flushed with 2 ml of filtered API brine in the production direction. Initial permeability to API brine then is determined in the production direction by flow with a differential pressure of 20 psi. Rates are measured every 25 ml of throughput to determine the initial permeability. The fluid to be tested then is introduced into a reservoir in communication with the treatment direction flowlines for approximately 90 minutes. A high differential pressure of about 500 psi is placed across the core in the treatment direction as the treatment fluid is flowed into the core. The core was then shut in for about 60 hours. The return or regained permeability was measured by injecting 500 ml of API brine at a rate of 5 ml/min through the core in the production direction. No attempt is made to squeeze or chemically remove the test fluid from the face of the core. The regained permeability then is determined from the flow data gathered.

FIG. 1 shows the results of a regained permeability test run with the fluid. The test showed a backpressure of approximately 200 psi and a regained permeability of 89%.

EXAMPLE 2

A second treatment fluid for use as a low leakoff frac-pack fluid was prepared according to a design for a formation with a permeability of 0.25 Darcy. The fluid combined 688 ml of seawater, 312 ml of INSTAVIS™ (a liquid gelling agent concentrate containing a hydroxypropyl guar gelling agent at a concentration of about 80 pounds per thousand gallons of treatment fluid ("ppt") available from Halliburton Energy Services, Inc. of Houston, Tex.). MO-67™, which is a pH adjusting agent comprising NaOH, was added in an amount sufficient to obtain a pH of about 9.3. A low-leakoff particulate comprising hydroxypropyl guar crosslinked with boron was added at a concentration equivalent to 80 ppt. A borate crosslinker was added at a concentration of 2 gallons per thousand gallons of treatment fluid ("gpt") (CL-38™ crosslinker, available from Halliburton Energy Services, Inc of Houston, Tex.). A gel breaker was added at a concentration equivalent to 10 gpt (VICON NF™, available from Halliburton Energy Services, Inc. of Houston, Tex.) along with a catalyst for activation of the gel breaker at a concentration equivalent to 2 gpt (CAT-OS-1™ breaker catalyst, available from Halliburton Energy Services, Inc. of Houston, Tex.). The base gel had a viscosity of 18.2 cP.

The ability of the treatment fluids of the present invention to provide static fluid loss control and the regained permeability subsequent to the treatment is determined in accordance with the following procedure. A synthetic core material comprising a ceramic having a 5 micron permeability is prepared in lengths of about 4 to 6 cm. The cores have a diameter of about 2.4 cm to 2.6 cm. The cores then are vacuum saturated in filtered API brine. Individual cores then are mounted in a Hassler sleeve device. The flow direction from left-to-right is designated as the production direction and from right-to-left is designated as the treatment direction to simulate the relative directions of movement in treating an actual subterranean formation. A hollow spacer is installed adjacent the core to act as a perforation cavity. Overburden pressure on the Hassler sleeve is administered by maintaining differential pressure from the treating pressure being used. The core is heated to and then maintained throughout the test at a temperature of 180° F. The core then is flushed with 2 ml of filtered API brine in the production direction. Initial permeability to API brine then is determined in the production direction by flow with a differential pressure of 20 psi. Rates are measured every 25 ml of throughput to determine the initial permeability. The fluid to be tested then is introduced into a reservoir in communication with the treatment direction flowlines for approximately 90 minutes. A high differential pressure of about 500 psi is placed across the core in the treatment direction as the treatment fluid is flowed into the core. The core was then shut in for about 48 hours. The return or regained permeability was measured by injecting 500 ml of API brine at a rate of 2 ml/min through the core in the production direction. No attempt is made to squeeze or chemically remove the test fluid from the face of the core. The regained permeability then is determined from the flow data gathered.

Figure 2:
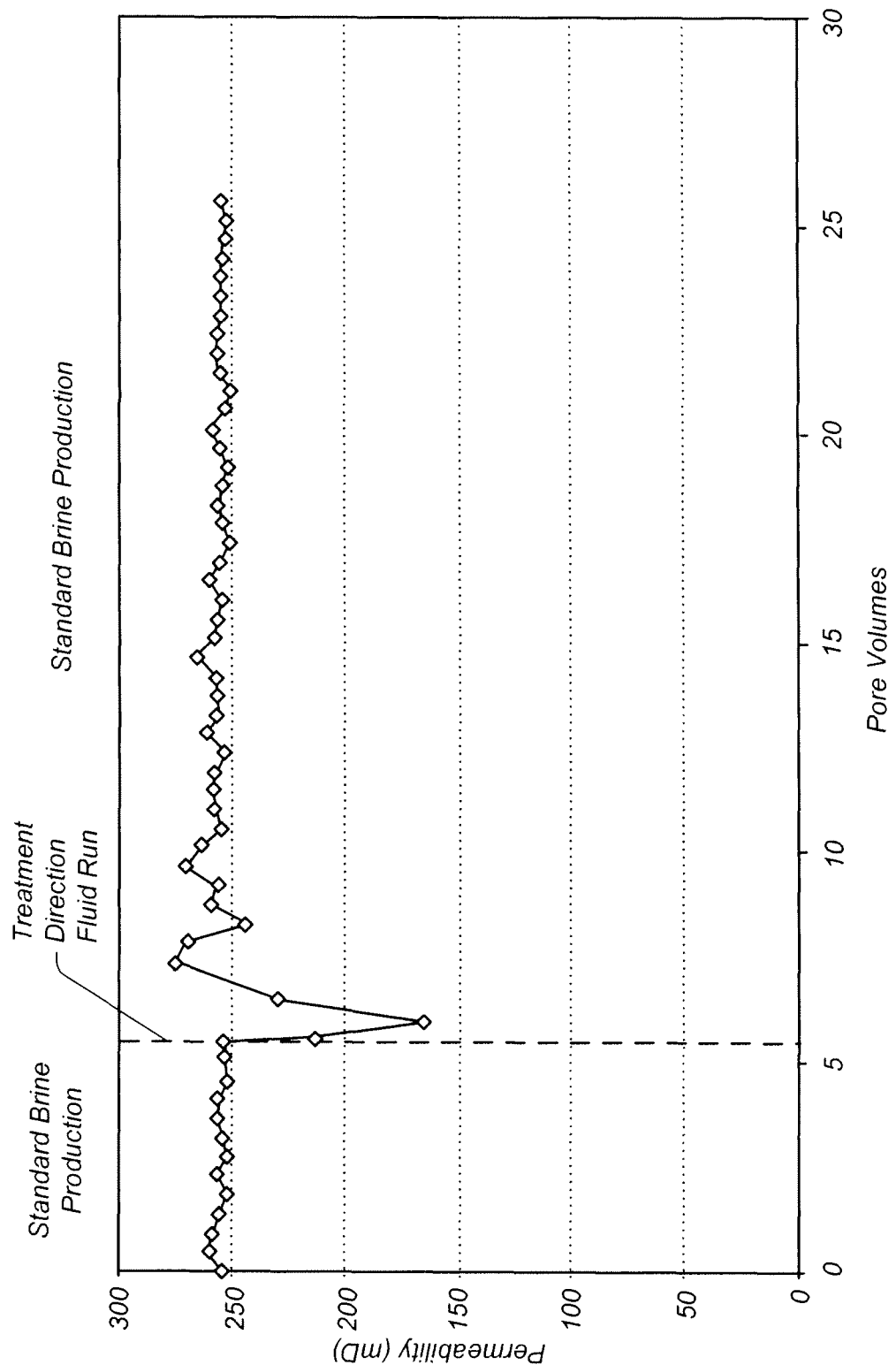
FIG. 2 illustrates another regained permeability profile for a treatment fluid prepared according to an embodiment of the present invention.

FIG. 2 shows the results of a regained permeability test run with the fluid. The test showed a backpressure of approximately 200 psi and a regained permeability of 99%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising an aqueous fluid, and a low-leakoff particulate;
   contacting a subterranean formation with the treatment fluid;
   allowing the low-leakoff particulate to de-link so that at least a portion of the low-leakoff particulate enters the liquid phase,
      wherein the low-leakoff particulate comprises a low molecular weight modified polysaccharide that has been crosslinked with a crosslinking agent wherein the modified polysaccharide contains one or more of the following monosaccharide units: galactose, mannose, glucoside glucose, xylose, arabinose, fructose, glucuronic acid, or pyranosyl sulfate; and
   bridging at least one pore throat in the subterranean formation with the low-leakoff particulate.

2. The method of claim 1 wherein the aqueous fluid comprises at least one component selected from the group consisting of: fresh water, saltwater, brine, and weighted brine.

3. The method of claim 1 wherein the treatment fluid comprises from about 5 to about 120 pounds of low-leakoff particulates per thousand gallons of treatment fluid.

4. The method of claim 1 wherein the low-molecular weight polymer has been depolymerized.

5. The method of claim 1 wherein the low-leakoff particulate comprises from about 0.1% to about 10% of the crosslinking agent by weight of the low-leakoff particulate.

6. The method of claim 1 wherein the treatment fluid further comprises a buffering agent, and wherein the low-leakoff particulate comprises from about 0.01% to about 10% of the buffering agent by weight of the low-leakoff particulate.

7. The method of claim 1 wherein the treatment fluid further comprises a pH adjusting agent.

8. The method of claim 7 wherein the pH adjusting agent comprises at least one compound selected from the group consisting of: formic acid, fumaric acid, acetic acid, acetic anhydride, hydrochloric acid, sodium hydroxide, potassium hydroxide, lithium hydroxide, and any combination thereof.

9. A method comprising:
   providing a treatment fluid comprising an aqueous fluid, a low-leakoff particulate, and proppant particulates;
      wherein the low-leakoff particulate comprises a modified polysaccharide that has been crosslinked with a crosslinking agent, wherein the modified polysaccharide contains one or more of the following monosaccharide units: galactose, mannose, glucoside glucose, xylose, arabinose, fructose, glucuronic acid, or pyranosyl sulfate;
   contacting a subterranean formation with the treatment fluid at a pressure sufficient to create at least one fracture therein;
   contacting at least a portion of the treatment fluid with a breaker wherein the low-leakoff particulate de-links such that at least a portion of the low-leakoff particulate enters the liquid phase;
   bridging at least one pore throat in the subterranean formation with the low-leakoff particulate; and
   recovering at least a portion of the treatment fluid.

10. The method of claim 9 wherein the treatment fluid comprises from about 5 to about 120 pounds of low-leakoff particulates per thousand gallons of treatment fluid.

11. The method of claim 9 wherein the treatment fluid further comprises a pH adjusting agent and wherein the pH adjusting agent comprises at least one compound selected from the group consisting of: formic acid, fumaric acid, acetic acid, acetic anhydride, hydrochloric acid, sodium hydroxide, potassium hydroxide, lithium hydroxide, and any combination thereof.

12. The method of claim 9 wherein the step of contacting at least a portion of the treatment fluid with a breaker occurs after the treatment fluid has contacted the subterranean formation.

13. The method of claim 12 wherein the breaker reduces the pH of the treatment fluid to cause the low-leakoff particulate to de-link.

* * * * *